United States Patent [19]

Kato

[11] Patent Number: 5,574,575
[45] Date of Patent: Nov. 12, 1996

[54] FACSIMILE MACHINE

[75] Inventor: Tokunori Kato, Ichinomiya, Japan

[73] Assignee: Brother Kogyo Kabushiki Kaisha, Nagoya, Japan

[21] Appl. No.: 77,395

[22] Filed: Jun. 17, 1993

[30] Foreign Application Priority Data

Jun. 18, 1992 [JP] Japan .................................. 4-186256

[51] Int. Cl.⁶ ..................................................... H04N 1/04
[52] U.S. Cl. ........................... 358/474; 358/401; 358/494; 358/444
[58] Field of Search .................................. 358/400, 401, 358/409, 474, 494, 498, 468, 296, 444

[56] References Cited

U.S. PATENT DOCUMENTS

| | | |
|---|---|---|
| 4,297,727 | 10/1981 | Ogawa et al. . |
| 4,866,535 | 9/1989 | Kubota et al. ........................ 358/474 |
| 4,980,776 | 12/1990 | Aosaki et al. ........................ 358/494 |

FOREIGN PATENT DOCUMENTS

| | | |
|---|---|---|
| 63-21154 | 1/1988 | Japan . |
| 63-116873 | 5/1988 | Japan . |
| 63-46628 | 9/1988 | Japan . |

*Primary Examiner*—Edward L. Coles, Sr.
*Assistant Examiner*—Thomas D. Lee
*Attorney, Agent, or Firm*—Oliff & Berridge

[57] ABSTRACT

In an image recording apparatus, a feeding mechanism synchronously feeds an original bearing an original image and image receiving medium for receiving an image, the original image having successive original image sections. A reading device reads out each of the successive original image sections and for producing a set of original image data representative of the each original image section, the reading device cooperating with the feeding mechanism so as to read out the successive original image sections one by one, to thereby produce successive sets of original image data representative of the successive original image sections one by one. A transfer unit transfers one by one the successive sets of original image data from the reading device. A shift register receives one by one the successive sets of original image data transferred by the transfer unit. A recording device records an image section on the image receiving medium in accordance with each of the successive sets of original image data received by the shift register, the recording device cooperating with the feeding mechanism so as to record successive image sections on the image receiving medium in accordance with the successive sets of original image data successively received by the shift register. A transfer controller is provided for controlling the transfer unit so that the recording device may complete recording an image section in accordance with a set of original image data which is received by the shift register and which represents each of the successive original image sections before the transfer unit transfers to the shift register a next set of original image data representative of a next original image section which is positioned next to the each original image section and which is read out by the reading device subsequent to the each original image section.

16 Claims, 3 Drawing Sheets

FACSIMILE MACHINE

BACKGROUND OF THE INVENTION

1. Field of the Invention

The present invention relates to an image copying apparatus of a type that is provided with a feeding mechanism for feeding an original to be copied and image receiving medium synchronously with each other. More particularly, the present invention relates to a facsimile machine of a type that has a copy function and that is provided with a feeding mechanism for synchronously feeding an original and image receiving medium.

2. Description of the Related Art

There has been known a conventional facsimile machine of a type that is provided with only a single motor which is use for feeding both an original and image receiving medium. The facsimile machine includes reading means for reading an original image on the original which is being fed by the single motor and for producing an original image data representative of the original image. The facsimile machine further includes recording means for receiving image data and recording, in response to the image data, an image on image receiving medium which is also being fed by the single motor. For example, the recording means is a thermal head, and the image receiving medium is a heat-sensitive paper. The facsimile machine has an image transmission function and an image receiving function. In the image transmission mode, the reading means reads out the original image to produce the original image data which is then encoded before being transmitted to a remote facsimile machine. In the image reception mode, the facsimile machine receives image data transmitted from a remote facsimile machine and decodes the received image data. The recording means records, in response to the decoded image data, an image on the image receiving medium.

Generally, the facsimile machine further has an image copy function which is attained by combination of the above-described image transmitting function and image receiving function. More specifically, in the image copy mode, the facsimile machine controls the reading means to read out the original image on the original being fed by the motor to produce the original image data, transfers the original image data to the recording means, and allows the recording means to record, in response to the original image data, the original image on the image receiving medium. Since the single motor is used for feeding both the original and the image receiving medium, the original and the image receiving medium are fed synchronously with each other. In the image copy mode, therefore, it is necessary that the recording means should perform its recording operation synchronously with the reading operation of the reading means. In order to synchronize the recording operation and the reading operation, in the conventional facsimile machine, the thermal head is designed to include: a shift register for receiving the original image data in serial form and for outputting the original image data in parallel form; a latch memory for receiving the original image data from the shift register and for temporarily storing them; a drive circuit connected to the latch memory for driving a thermal element array, according to the original image data stored in the latch memory, so as to selectively heat the thermal element array to thereby record the original image on the heat-sensitive paper; and the thermal element array.

In the copy mode, the thermal head of the above-described structure performs its recording operation synchronously with the reading operation, as will be described below.

While the motor synchronously feeds the original and the heat-sensitive paper by a line distance, the reading means reads out one line (which will be referred to as a "noted line," hereinafter) of the original image, and produces the original image data for the noted line. The reading means transfers, in serial form, the original image data for the noted line to the shift register of the thermal head. After all the original image data for the noted line have been completely transferred to the shift register, they are transferred in parallel form from the shift register to the latch memory.

The thermal head then reads out the next line of the original image which is positioned next to the noted line, and produces the original image data for the next line. The thermal head then transfers the thus produced original image data to the shift register. While the data for the next line is thus being read and transferred to the shift register, the drive circuit of the thermal head selectively heats the thermal element array according to the data stored in the latch memory. As a result, the original image of the noted line is recorded on the heat-sensitive paper using well-known method. In this way, one line is recorded while the next line is read. That is, the recording and reading operations are performed simultaneously or synchronously.

The above-described conventional facsimile machine has, however, a problem in that the latch memory provided in the thermal head is expensive and therefore increases the production cost of the entire facsimile machine.

SUMMARY OF THE INVENTION

Accordingly, an object of the present invention is to provide an image copying apparatus such as a facsimile machine having an image copying function which is provided with a thermal head having no latch memory. In other words, the object of the present invention is to provide a new method for attaining synchronization between the reading operation and the recording operation without the use of the latch memory. The method should be preferably applied to an image copying apparatus such as a facsimile machine having an image copying function of a type that is provided with a mechanism for synchronously feeding the original and the image receiving medium.

Accordingly, the present invention provides an image recording apparatus for reading out an original image on an original and reproducing the original image on image receiving medium. The image recording apparatus comprises: means for synchronously feeding an original bearing an original image and image receiving medium for receiving an image, the ,original image having successive original image sections; means for reading out each of the successive original image sections and for producing a set of original image data representative of the each original image section, the reading means cooperating with the feeding means so as to read out the successive original image sections one by one, to thereby produce successive sets of original image data representative of the successive original image sections one by one; means for transferring one by one the successive sets of original image data from the reading means; means for receiving one by one the successive sets of original image data transferred by the transferring means; means for recording an image section on the image receiving medium in accordance with each of the successive sets of original image data received by the receiving means, the recording means cooperating with the feeding means so as to record successive image sections on the image receiving medium in accordance with the successive sets of original image data successively received by the receiving means; and means for controlling the transferring means so that the recording means may complete recording an image section in accordance with a set of original image data which is received by the receiving means and which represents each of the successive original image sections before the transferring means transfers to the receiving means a next set of original image data representative of a next original image section which is positioned next to the each original image section and which is read out by the reading means subsequent to the each original image section.

Preferably, the transfer controlling means includes: means for judging whether or not the recording means completes recording the image section in accordance with the set of original image data representative of the each original image section; means for controlling the transferring means to start transferring the next set of original image data representative of the next original image section after when the judging means determines that the recording means completes recording the image section in accordance with the set of original image data representative of the each original image section.

The image recording apparatus may further comprise means for temporarily storing each of the successive sets of original image data produced for each of the successive original image sections, wherein the reading means outputs each of the successive sets of original image data to the image data storing means and the transferring means transfers each of the successive sets of original image data from the image data storing means to the receiving means.

The transferring means includes first means for transferring each of the successive sets of original image data from the image data storing means to the receiving means with a direct memory access transfer manner.

The reading means produces each of the successive sets of original image data in analog form. The image recording apparatus further comprises means for receiving each of the successive sets of analog original image data from the reading means and for converting it into digital form, the analog-digital conversion means outputting each of the successive sets of digital original image data to the image data storing means and the first direct memory access transfer means transfers each of the successive sets of digital original image data from the image data storing means to the receiving means.

The image receiving medium preferably is a heat-sensitive paper. The recording means may include: a thermal element array adapted for recording an image section on the heat-sensitive paper; and a drive circuit for driving the thermal element array in accordance with a set of original image data received by the receiving means to thereby control the thermal element array to record, on the heat-sensitive paper, an image section corresponding to the original image section represented by the set of original image data.

The image recording apparatus may further comprise means for storing DAC data representative of a threshold value adapted for converting the analog original image data into digital form, wherein the first direct memory access transfer means also transfers the DAC data from the DAC data storing means to the analog-digital conversion means, the transfer controlling means controlling the first direct memory access transfer means to transfer the DAC data from the DAC data storing means to the analog-digital conversion means during the analog-digital conversion means receives a set of analog original image data representative of each of the successive original image sections so that the analog-digital conversion means may compare the set of analog original image data with the DAC data to thereby produce a set of digital original image data, the set of digital original image data being inputted to the image data storing means so as to be temporarily stored therein, the transfer controlling means further controlling the first direct memory access transfer means to transfer the set of digital original image data representative of the each original image section temporarily stored in the image data storing means to the receiving means after when the judging means judges that the recording means completes recording an image section in accordance with a preceding set of original image data representative of a preceding original image section which is positioned precedingly to the each original image section and which is read out by the reading means precedingly to the each original image section.

According to another aspect, the present invention provides a facsimile machine providing an image transmission mode, an image reception mode and an image copy mode. The facsimile machine comprises: feeding means for synchronously feeding an original bearing an original image and image receiving medium for receiving an image; reading means, in cooperation with the feeding means, for reading out the original image and producing image data representative thereof in analog form; DAC data storing means for storing DAC data representative of a threshold value; analog-digital conversion means for receiving the DAC data from the DAC data storing means and the analog image data from the reading means to compare the analog image data with the DAC data to thereby convert the analog image data into digital form; image data storing means for temporarily storing digital image data; a shift register for receiving digital image data from the image data storing means; recording means, in cooperation with the feeding means, for recording an image on the image receiving medium in accordance with the digital image data received by the shift register; modem means for receiving digital image data from a remote facsimile machine and outputting the digital image data to the image data storing means in an image reception mode and for receiving the digital image data from the image data storing means and transmitting the digital image data toward a remote facsimile machine in an image transmission mode; first transfer means connectable between the analog-digital conversion means and the DAC date, storing means and between the shift register and the image data storing means; second transfer means connected between the analog-digital conversion means and the image data storing means; transfer control means for controlling the first transfer means to be connected between the analog-digital conversion means and the DAC data storing means in the image transmission mode, for controlling the first transfer means to be connected between the shift register and the image data storing means in the image reception mode, and for controlling the first transfer means to be connected alternately between the analog-digital conversion means and the DAC data storing means and between the shift register and the image data storing means in an image copy mode; and operation control means for performing: the image transmission mode in which the analog image data is produced by the reading means and compared with the DAC data to be converted into the digital image data which is then transferred through the second transferring means to the image data storing means, from which the digital image data is outputted to the modem means; the image reception mode in which the digital image data received by the modem means is outputted to the image data storing means from which the image data is transferred through the first transferring means to the shift register; and the image copy mode in which the analog image data is produced by the reading means and is compared with the DAC data to be converted into the digital image data which is then transferred through the second transferring means to the image data storing means, from which the digital image data is further transferred through the first transferring means to the shift register.

The original image has successive image sections. The reading means reads out the successive image sections one by one to thereby produce a successive sets of analog image data representative of the successive image sections one by one. In the image copy mode, the transfer control means controls the first transferring means to be connected between the DAC data storing means and the analog-digital conversion means at least during the analog-digital conversion means receives a set of analog image data representative of each of the successive image sections so that the analog-digital conversion means may compare the set of analog image data with the DAC data to thereby produce a set of digital image data representative of the each image section and to be connected between the image data storing means and the shift register at least after the recording means completes recording an image section in accordance with a preceding set of digital image data representative of a preceding image section which is positioned precedingly to the each image section and which is read out by the reading means precedingly to the each image section.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A facsimile machine of a preferred embodiment to which applied is the present invention will be described while referring to the accompanying drawings.

Figure 1:
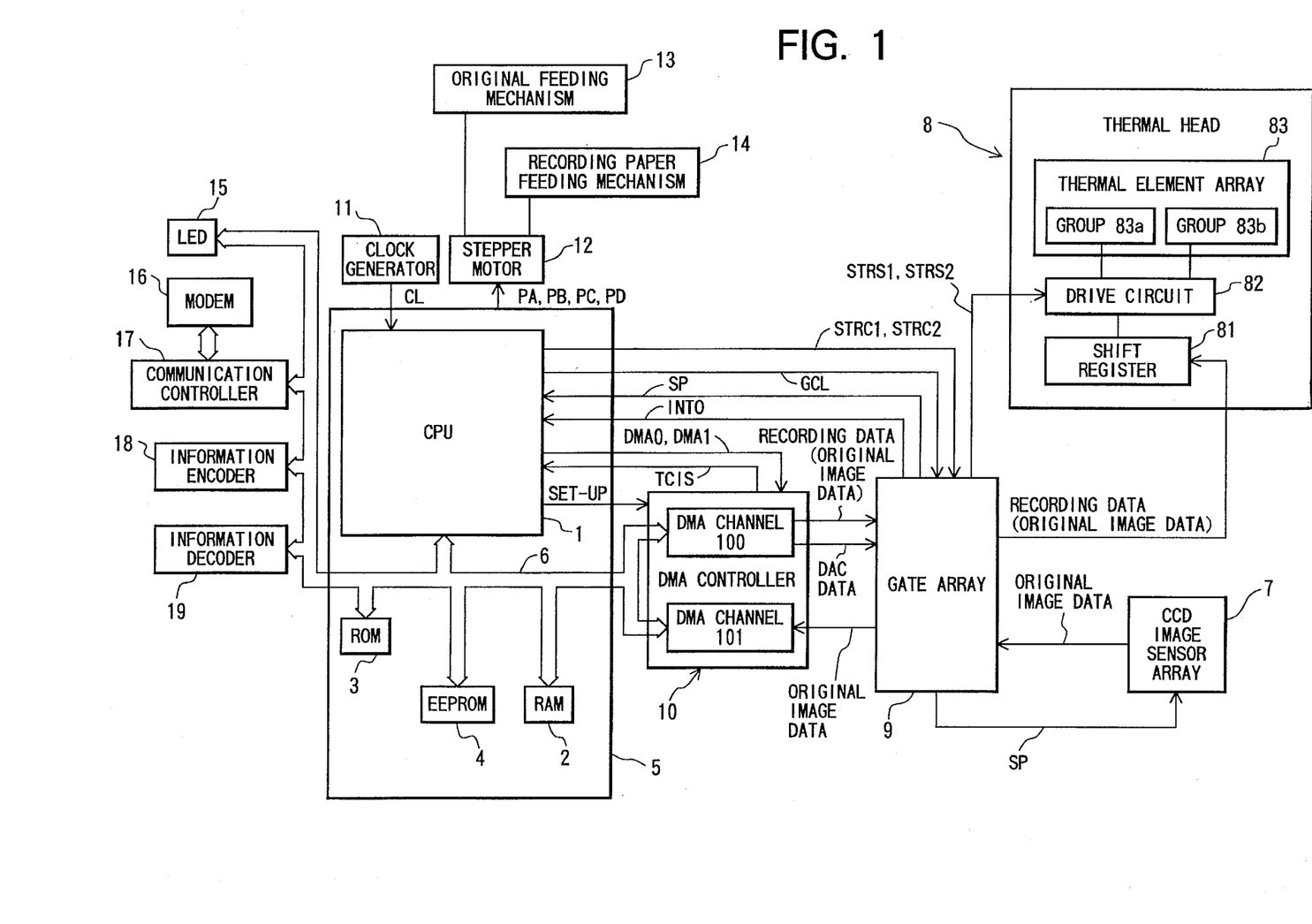
FIG. 1 is a block diagram of a control unit of an image copying apparatus of a preferred embodiment of the present invention.

As shown in FIG. 1, a control unit of the facsimile machine includes a microcomputer 5 having a central processing unit (CPU) 1, a RAM 2, an EEPROM 4, and a ROM 3, a direct memory access (DMA) controller 10 having a pair of DMA channels 100 and 101, an information decoder 19, an information encoder 18, a communication controller 17 and a light emission diode (LED) 15 which are communicated via a bus 6 with one another. The communication controller 17 is connected to a modem 16. The CPU 1 is additionally connected to a clock generator 11 and a stepper motor 12 which is in turn connected to both an original feeding mechanism 13 and a recording paper feeding mechanism 14. A gate array 9 connected to the DMA controller 10 is controlled by the CPU 1. The gate array 9 is also connected to a thermal head 8 and a charge-coupled device (CCD) sensor 7.

The clock generator 11 generates clock pulses CL and outputs them to the CPU 1. The CPU 1 controls the stepper motor 12 and the gate array 9, in response to the clock pulses CL.

Facsimile machines are generally standardized to transmit successive lines of image with a predetermined time cycle (which will be referred to as a "transmission time cycle," hereinafter.) The facsimile machine of this example is standardized to have the transmission time cycle of 10 ms. In order to transmit successive lines within 10 ms, the facsimile machine of this example is so designed as to read out successive lines with a time cycle (which will be referred to as a "read out time cycle," hereinafter) of 5 ms.

The stepper motor 12 has a rotor and a stator which is positioned surrounding the rotor and which is provided with four exciting coils A, B, C and D in this order. The stepper motor 12 is of a two-phase exciting type, and the four exciting coils define four pairs of coils: A-B, B-C, C-D, and D-A. When one pair of coils are supplied with electric current, the rotor is rotated by a predetermined angle and then stopped. Another pair of coils are then supplied with electric current, so that the rotor is further rotated by the predetermined angle and then stopped. Accordingly, successively energizing the four pairs of coils allows the rotor to stepwisely rotate by the predetermined angle. In the facsimile machine of this example, the CPU 1 continuously supplies the four exciting coils A, B, C and D with four drive pulses PA, PB, PC and PD, respectively. When the drive pulses are HIGH, electric currents are supplied to the corresponding exciting coils. When the drive pulses are LOW, on the other hand, no electric currents are supplied. With such a structure, the CPU 1 switches the four drive pulses between HIGH and LOW so as to successively energize the four pairs of coils.

In this example, since it is necessary to read out successive lines with the read out time cycle of 5 ms, the CPU 1 switches the drive pulses PA, PB, PC and PD between HIGH and LOW at such a timing and a manner as successively energize the four pairs of coils at a time cycle of 5 ms. In order to control the timing for switching the drive pulses, the CPU uses the clock pulses CL inputted from the clock generator 11. Since the structure of the stepper motor 12 is well known in the art, further explanation thereof will be omitted.

The original feeding mechanism 13 is driven by the rotor of the stepper motor 12 so as to stepwisely feed the original with the time cycle of 5 ms. The original feeding mechanism has such a structure that transmits the original in its auxiliary scanning direction. Accordingly, the original repeatedly increments by a line distance in the auxiliary scanning direction with the time cycle of 5 ms. The recording paper feeding mechanism 14 is also driven by the rotor of the stepper motor so as to stepwisely feed the recording paper with the time cycle of 5 ms. The recording paper feeding mechanism has such a structure that transmits the recording paper in its auxiliary scanning direction. The recording paper therefore repeatedly increments by a line distance in the auxiliary scanning direction with the time cycle of 5 ms. As apparent from the above, the stepper motor 12 feeds the original and the recording paper in synchronous relation with each other. The structures of the original feeding mechanism and the recording paper feeding mechanism are also well known in the art, and therefore further explanation thereof will be omitted.

The CCD image sensor array 7 is mounted in the facsimile machine to extend in a main scanning direction which extends perpendicularly to the auxiliary scanning direction in which the original feeding mechanism 13 feeds the original. A light source (not shown in the drawing) is also mounted in the facsimile machine to extend in the main scanning direction. The CCD image sensor array 7 serves to detect light which has been emitted from the light source and reflected from the original at its area where the CCD image sensor array confronts. In other words, the CCD image sensor array 7 serves to read out a portion of the original image which the CCD image sensor array confronts. While the original feeding mechanism 13 advances or increments the original by one line distance in the auxiliary scanning direction, the CCD image sensor array 7 reads out the original image on the original. Accordingly, the CCD image sensor array reads out one line of the original image. While thus reading out one line of the original image, the CCD image sensor array 7 generates analog original image data representive of the one line and outputs them to the gate array 9 in serial form. (In other words, the CCD image sensor array 7 generates one by one analog original image data representative of all the picture elements on the one line.) The structure of the CCD image sensor array 7 is well known in the art, and therefore further explanation thereof will be omitted.

The CCD image sensor array 7 is supplied with a start pulse signal SP from the gate array 9, upon which it starts reading out a line of the original image which the CCD image sensor array confronts. The gate array 9 generates start pulse signals SP with the time cycle of 5 ms, based on gate array clock signals GCL which the CPU 1 generates in response to the clock pulses CL generated by the clock generator 11. The CCD image sensor array 7 therefore repeatedly starts its reading operation with the time cycle of 5 ms. The combined effect of the time cycle of 5 ms with which the CCD image sensor array repeatedly starts its reading operation and the time cycle of 5 ms with which the original feeding mechanism 13 repeatedly transmits the original by a line distance enables the CCD image sensor array 7 to read out successive lines on the original image arranged in the auxiliary scanning direction one by one.

The thermal head 8 used in the present invention includes no latch memory. More specifically, the thermal head 8 includes: a shift register 81 for receiving, in serial form, recording data which are representative of each line image to be recorded on the recording paper and which are supplied from the gate array 9; a drive circuit 82, connected to the shift register 81, for driving a thermal element array 83 according to the recording data received by the shift register 81 so as to selectively heat the thermal element array 83; and the thermal element array 83. With this structure, the shift register 81 serves as a line memory for the drive circuit 82. The thermal element array 83 is provided in the facsimile machine to extend in a main scanning direction which extends perpendicularly to the auxiliary scanning direction in which the recording paper feeding mechanism 14 feeds the recording paper. The thermal element array 83 serves to selectively heat, according to the recording data representative of each line image received in the shift register, a portion of the recording paper which the thermal element array confronts. The thermal element array 83 is divided into two groups of thermal elements: a first group 83a and a second group 83b, due to limitations to the power capacity of the thermal element array. The two groups of thermal elements 83a and 83b are driven by the drive circuit 82 to be heated in different timings, rather than simultaneously, in order to avoid placing an unnecessarily large load on the drive circuit 82. With such a structure, while the recording paper feeding mechanism 14 advances or increments the recording paper by one line distance in the auxiliary scanning direction, the drive circuit 82 drives the thermal element groups 83a and 83b in succession so that they may selectively heat the recording paper according to the recording data representative of each line image. Thus, the thermal head array 83 records one line of the image to be recorded. As the recording paper feeding mechanism 14 repeatedly advances the recording paper by a line distance, the thermal head 8 records on the recording paper successive image lines arranged in the auxiliary scanning direction. Japanese Patent Publication Kokai Nos. SHO-63-21154 and SHO-63-116873 describe the structure of such a drive circuit 82 as is capable of consecutively heating the groups of thermal elements, and therefore further description thereof will be omitted. (It should be noted, however, that the thermal heads described in the publications are provided with latch memories, contrary to the thermal head of the present invention).

The CPU 1 continuously supplies the gate array 9 with a first write strobe command STRC1, upon which the gate array 9 continuously supplies the drive circuit 82 with a first write strobe signal STRS1. The CPU 1 also continuously supplies the gate array 9 with a second write strobe command STRC2, upon which the gate array 9 continuously supplies the drive circuit 82 with a second write strobe signal STRS2. When the CPU outputs the write strobe command STRC (STRC1 or STRC2) of a HIGH level, the gate array 9 outputs the corresponding write strobe signal STRS (STRS1 or STRS2) of a HIGH level. When the CPU outputs the write strobe command STRC (STRC1 or STRC2) of a LOW level, the gate array 9 outputs the corresponding write strobe signal STRS (STRS1 or STRS2) of a LOW level. After all the recording data for one line image are completely inputted to the shift register 81, when the CPU switches the write strobe command STRC1 from HIGH to LOW, the gate array switches the write strobe signal STRS1 from HIGH to LOW. While receiving the signal STRS1 of LOW, the drive circuit 82 drives the first thermal element group 83a to selectively heat in accordance with the recording data stored in the shift register 81. Then, the CPU switches the write strobe command STRC2 from HIGH to LOW, whereupon the gate array switches the write strobe signal STRS2 from HIGH to LOW. While receiving the signal STRS2 of LOW, the drive circuit 82 drives the second thermal element group 83b to selectively heat in accordance with the recording data stored in the shift register 81. As will be described later, the commands STRC1 and STRC2, i.e., the signals STRS1 and STRS2 are so controlled as to be in the LOW level within the time period of 5 ms during the recording paper feeding mechanism 14 advances the recording paper by a line distance, as a result of which one line is recorded on the heat-sensitive recording paper. It is noted that the CPU adjusts the pulse widths of the commands STRC1 and STRC2, i.e., the signals STRS1 and STRS2 dependently on the temperature of the thermal element groups 83a and 83b, respectively.

The ROM 3 stores therein digital-analog conversion (DAC) data representative of threshold values used for converting the analog value of the original image data obtained by the CCD image sensor array 7 into a digital value. The ROM 3 stores the DAC data for all the picture element positions on one line on the original. The DAC data for each of all the picture element positions has been calculated dependently on photosensitivity of the CCD image sensor array 7 with respect to the corresponding picture element position. The ROM also stores various programs for performing the image receiving, transmitting and copying functions.

The gate array 9 serves as an analog-digital converter for the original image data supplied from the CCD image sensor array 7. When the analog original image data representative of all the picture elements on one line are supplied one by one to the gate array 9 from the CCD image sensor array 7, the DAC data for all the picture element positions on one line are also supplied one by one to the gate array 9 from the ROM 3 via the DMA controller 10. The gate array 9 compares the analog value of the original image data of each picture element with the value of the DAC data for the corresponding picture element position, and obtains a digital original image data representative of the corresponding picture element position. The gate array 9 then outputs the digital original image data to the DMA controller 10. Thus, the gate array 9 successively converts the analog original image data of all the picture elements on one line of the original into digital form and transfers them to the DMA controller 10.

The DMA controller 10 is an interface of the special hardware for direct transfer of data between a memory and another device. In the DMA controller, data is not subjected to a program controlled data transfer operation achieved by the CPU, but is directly transferred between the devices. The DMA controller can therefore attain a high speed data transfer operation. In the facsimile machine of this embodiment, the DMA controller 10 is connected to the gate array 9. The DMA controller 10 is also connected, through the bus 6, to the ROM 3 and the RAM 2. The DMA controller 10 has two channels 100 and 101 through which data transfer operation is performed. The CPU 1 controls the DMA controller 10 so that the DMA channels 100 and 101 may perform direct transfer operation between the gate array 9 and the ROM 3 and the RAM 2. The CPU controls the DMA controller L0 to set up each of the DMA channels 100 and 101 into a condition ready for performing a desired data transfer operation. In an image reception mode, the CPU 1 sets up the DMA channel 100 into a condition for transferring incoming data temporarily stored in the RAM 2 to the gate array 9. The CPU 1 sets up the DMA channel 101 into a condition for transferring no data. In an image transmission mode, the CPU 1 sets up the DMA channel 100 into a condition for transferring the DAC data from the ROM 3 to the gate array 9. The CPU sets up the DMA channel 101 into a condition for transferring the original image data from the gate array 9 to the RAM 2. In the image copy mode, the CPU sets up the DMA channel 101 into a condition for transferring the original image data from the gate array 9 to the RAM 2, similarly as in the image transfer mode. The CPU 1 alternately sets up the DMA channel 100 into a condition for transferring the DAC data from the ROM 3 to the gate array 9 and into another condition for transferring the original image data from the RAM 2 to the gate array. Stated differently, the CPU switches to set up the DMA channel 100 between a DAC data condition for transferring the DAC data and an image data condition for transferring the original image data. As apparent from the above, though the image reception and transmission modes set up each DMA channel into a condition for transferring only a corresponding single kind of data, the image copy mode sets up the DMA channel 100 to alternately transfer two kinds of data.

In order to control the data transfer operation by the DMA channels, the CPU continuously supplies the DMA controller 10 with transfer control signals DMA0 and DMA1 for controlling the transfer operations of the DMA channels 100 and 101, respectively. The CPU switches the signals DMA0 and DMA1 between HIGH and LOW. While the CPU outputs the signal DMA0 of HIGH to the DMA channel 100, the DMA channel 100 performs the desired data transfer operation set up by the CPU. Similarly, while the CPU outputs the signal DMA1 of HIGH to the DMA channel 101, the DMA channel 101 performs the desired data transfer operation set up by the CPU.

The RAM 2 serves to temporarily store therein the digital original image data transferred from the gate array 9 through the DMA channel 101. In the image transmission mode, the original image data thus stored in the RAM 2 are then transferred to the information encoder 18 where the original image data are encoded. In the image copying mode, the original image data thus stored in the RAM 2 are then transferred through the DMA channel 100 to the gate array 9. The RAM 2 further serves to temporarily store therein the incoming data which have been decoded by the decoder 19 in the image reception mode. The incoming data thus stored in the RAM 2 are then transferred through the DMA channel 100 to the gate array 9.

The communication controller 17 serves to transfer the incoming data received at the modem 16 to the decoder 19 in the image reception mode and to transfer the original image data encoded by the encoder 18 to the modem 16 in the image transmission mode.

The LED 15 illuminates at colors which vary depending on whether the facsimile machine is in the image reception mode, the image transmission mode, or the image copy mode.

As described already, the gate array 9 serves as the analog-digital converter for serially outputting the produced digital original image data to the DMA channel 101 in the image transmission mode and the image copy mode. The gate array further serves to serially transfer the original image data from the DMA channel 100 toward the shift register 81 as the recording data in the image copy mode. In the image reception mode, the gate array serves to serially transfer the incoming data from the DMA channel 100 toward the shift register 81 as the recording data.

With the above-described structure, in order to control an entire part of the facsimile machine, the DMA controller 10 outputs to the CPU 1 a transfer completion information signal TCIS representing that the DMA controller has completely transferred all the image data for each line through the corresponding DMA channel. In addition, especially in the image copy mode, the gate array 9 continuously outputs to the CPU 1 an interrupt signal INT0 representing whether or not all the original image data of each line are completely transferred from and to the gate array 9 through the DMA controller 10. More specifically, the gate array 9 switches the interrupt signal INT0 from a HIGH level to a LOW level when the DMA channel 101 completes transferring all the original image data of each line from the gate array 9 to the RAM 2. The gate array 9 switches to return the interrupt signal INT0 from a LOW level to a HIGH level when the DMA channel 100 completes transferring all the original image data of each line from the RAM 2 to the gate array 9.

The operation of the facsimile machine having the above-described structure will be described hereinafter.

When the facsimile machine is energized, the CPU initializes the transfer control signals DMA0 and DMA1 to LOW levels. The CPU further initializes the write strobe commands STRC1 and STRC2 to HIGH levels, to thereby allow the gate array 9 to set the write strobe signals STRS1 and STRS2 to HIGH levels. The CPU initializes the gate array 9 so as to set the interrupt signal INT0 to a HIGH level.

The facsimile machine has the image reception mode, the image transmission mode and the image copy mode.

The image copy mode will be first described below with reference to FIGS. 2 and 3.

When the image copy mode is selected by an operator, the CPU 1 first sets up the DMA channel 100 into the DAC data transfer condition and sets up the DMA channel 101 into a condition for transferring the original image data.

The CPU 1 then starts outputting the drive pulses PA, PB, PC and PD to the exciting coils A, B, C and D of the stepper motor 12. The CPU switches the pulses PA, PB, PC and PD between HIGH and LOW levels, based on the clock signals CL from the clock pulse generator 11, so that the four pairs of coils A-B, B-C, C-D and D-A are successively energized at the time cycle of 5 ms. Accordingly, the rotor of the stepper motor 12 repeatedly advances in stepwise rotation at the predetermined angle with the time cycle of 5 ms. The rotor drives the original feeding mechanism 13 and the recording paper feeding mechanism 14 so that the original and the recording paper may be stepwisely fed by one line distance simultaneously with each other. Stated differently, the original and the recording paper are simultaneously transported in one line increment for each line read and recorded.

In accordance with the clock signals CL from the clock generator 11, the CPU 1 outputs to the gate array 9 the gate array clock signals GCL, whereupon the gate array generates the start pulse signals SP at the time cycle of 5 ms. The gate array outputs the start pulse signals SP to both the CCD image sensor array 7 and the CPU 1.

When receiving a lowering edge of the start pulse signal SP, the CCD image sensor array 7 starts reading the first line of the original and supplies the gate array 9 with analog original image data representing the first line. On the other hand, the CPU 1 receiving the lowering edge of the start pulse signal SP switches the transfer control signals DMA0 and DMA1 from LOW to HIGH. Receiving the signal DMA0 of HIGH level, the DMA channel 100 starts transferring the DAC data from the ROM 3 to the gate array 9. The gate array 9 compares the analog original image data for each picture element on the first line with the DAC data for the corresponding picture element position, and produces the digital original image data for the corresponding picture element. The DMA channel 101 receiving the signal DMA1 of HIGH level transfers the digital original image data thus produced by the gate array 9 to the RAM 2 where they are temporarily stored.

When the digital original image data for all the picture elements on the first line have been completely transferred to the RAM 2, the DMA controller 10 outputs to the CPU the transfer completion information signal TCIS, whereupon the CPU switches the DMA transfer control signals DMA0 and DMA1 from HIGH to LOW. Simultaneously, the gate array 9 shifts the interrupt signal INT0 from HIGH to LOW. Receiving the LOW interrupt signal INT0, the CPU 1 enters interrupt subroutine shown in FIG. 3. In the interrupt subroutine, the CPU 1 first judges whether or not either one of the write strobe commands STRC1 and STRC2 (i.e., either one of the write strobe signals STRS1 and STRS2) is now in the LOW levels, in a step S1. Stated differently, the CPU judges whether or not the thermal head 8 is now performing its recording operation by checking output of the write strobe commands. Since the commands STRC1 and STRC2 are now both set in the HIGH levels, program proceeds to step S2 where the CPU 1 switches to set up the DMA channel 100 into the image data transfer condition, upon which the DMA channel 100 prepares for transmitting the original image data from the RAM 2 to the shift register 81. In step S3, the CPU 1 switches the DMA transfer control signal DMA0 from LOW to HIGH, whereupon the DMA channel 100 begins transferring the original image data representing the first line stored in the RAM 2 to the gate array 9. The gate array 9 serially transfers the original image data to the shift register 81. Since the CPU 1 has already confirmed in the step S1 that the thermal head 8 is not performing its recording operation and therefore that the shift register now stores no recording data, inputting the original image data to the shift register 81 will not erase any previously inputted recording data.

When the DMA channel 100 has completely transferred all the original image data representing the first line to the shift register 81, the DMA controller 10 again outputs a transfer completion information signal TCIS to the CPU 1. Receiving the signal TCIS, the CPU confirms in step S4 that the transfer operation is complete, and shifts the DMA transfer control signal DMA0 from HIGH to LOW, in step S5. The CPU then switches to set up the DMA channel 100 into the DAC data transfer condition in step S6, whereupon the DMA channel 100 prepares for transferring DAC data. Then, in step S7, the CPU 1 sets up the DMA channel 101 into the image data transfer condition, upon which the DMA channel 101 prepares for transmitting from the gate array 9 to the RAM 2 original image data. Then, the gate array 9 shifts the interrupt signal INT0 from the low level to the high level so as to end the interrupt subroutine, and then the program returns to the main routine for the copying operation of the next (second) line.

The CPU shifts the write strobe command STRC1 from HIGH to LOW when it receives the transfer completion information signal TCIS representing that all the original image data for the first line have been completely transferred to the shift register 81. The signal STRC1 of LOW level allows the gate array 9 to shift the write strobe signal STRS1 from HIGH to LOW. Receiving the signal STRS1 of LOW level, the drive control circuit 82 drives the thermal element group 83a to selectively heat according to the original image data inputted in the shift register 81. The CPU then returns the command STRC1 from LOW to HIGH to thereby return the signal STRS1 from LOW to HIGH, as a result of which the drive control circuit 82 stops driving the thermal element group 83a. The CPU then shifts the command STRC2 from HIGH to LOW to thereby shift the signal STRS2 from HIGH to LOW, so that the drive control circuit 82 drives the other thermal element group 83b to selectively heat according to the original image data inputted in the shift register 81. The CPU then returns the command STRC2 from LOW to HIGH to thereby return the signal STRS2 from LOW to HIGH, as a result of which the drive control circuit 82 stops driving the thermal element group 83b. Through the above-described operation, the first line is recorded or reproduced on the heat-sensitive recording paper.

While the thermal head 8 is thus recording the first line on the recording paper, as shown in FIG. 2, the gate array 9 again outputs the start pulses SP to both the CCD image sensor array 7 and the CPU 1. Receiving the start pulse SP, the CCD image sensor array 7 starts reading out the second line of the original image to generate the analog original image data for the second line. Simultaneously, the CPU shifts the DMA transfer control signals DMA0 and DMA1 from LOW to HIGH. As a result, the analog original image data for the second line are successively converted into digital form and transferred to the RAM 2. When all the original image data for the second line have been completely transferred to the RAM 2, the DMA controller 10 outputs the transfer completion information signal TCIS to the CPU. Receiving the signal TCIS, the CPU shifts the DMA transfer control signals DMA0 and DMA1 from HIGH to LOW. Simultaneously, the gate array shifts the interrupt signal INT0 from HIGH to LOW, whereupon the CPU again starts the interrupt routine shown in FIG. 3. In the interrupt routine, as described already, the CPU first judges whether or not either the write strobe command STRC1 or STRC2 is low. In other words, the CPU judges whether or not the thermal head 8 has finished its recording operation for the first line. If it is judged that either one of the write strobe command STRC1 or STRC2 is in the low level, the CPU waits until when both the write strobe commands STRC1 and STRC2 are changed into the high level. When both the write strobe commands STRC1 and STRC2 are judged to be HIGH, the CPU sets up the DMA channel 100 into the image data transfer condition, and shifts the DMA transfer control signal DMA0 from LOW to HIGH. As a result, the original image data for the second line are transferred to the shift register 81. Since it has been confirmed that the thermal head 8 has finished its recording operation for the first line and therefore that the original image data for the first line are not stored in the shift register 10 any more, the transfer of the second line original image data to the shift register will not erase the first line original image data and therefore will not affect the recording operation for the first line.

The above described processes are repeated until all the subsequent lines of the original image are read and reproduced.

Figure 2:
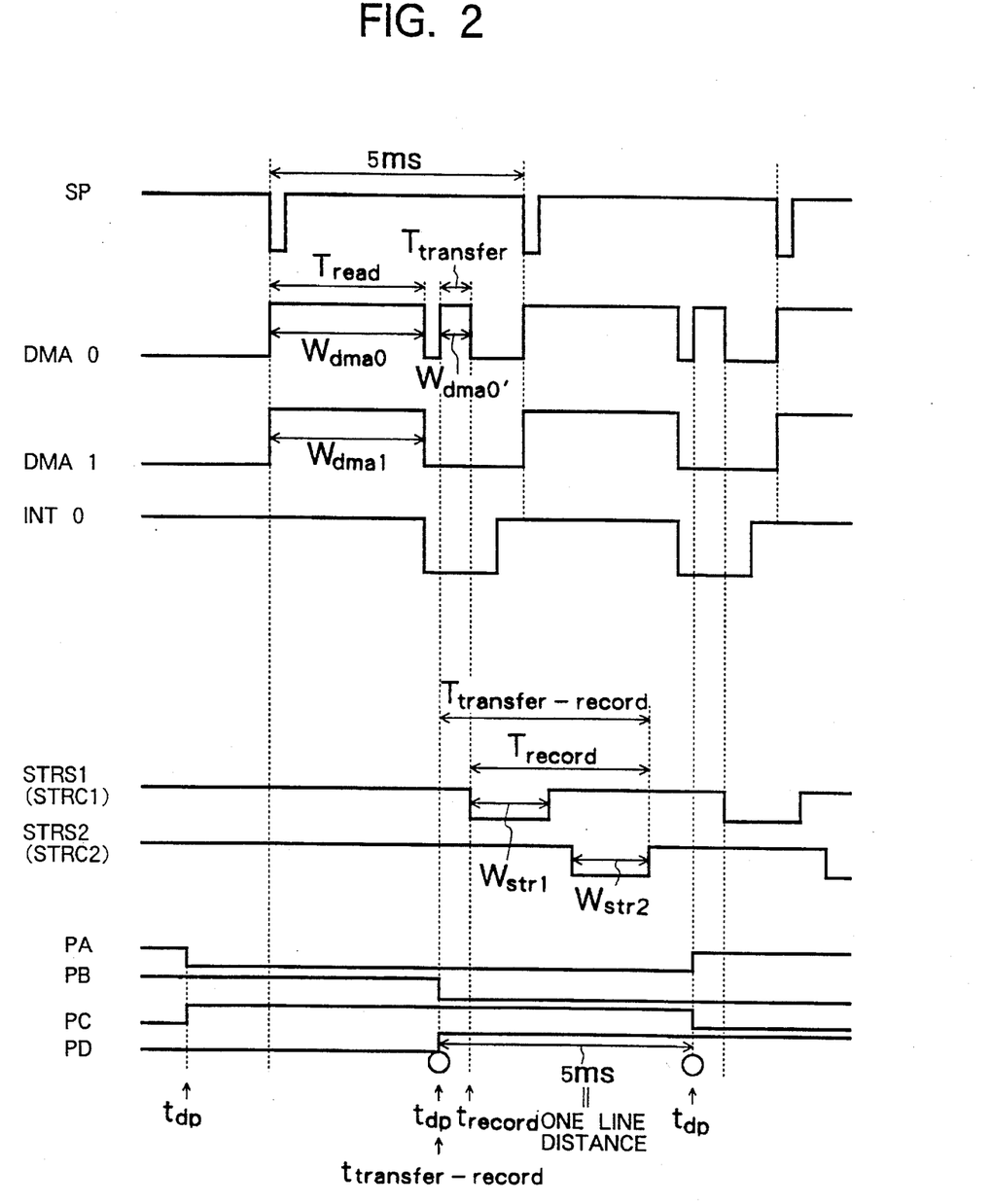
FIG. 2 is a timing chart showing the respective signals generated in the control unit of the facsimile machine.
Figure 3:
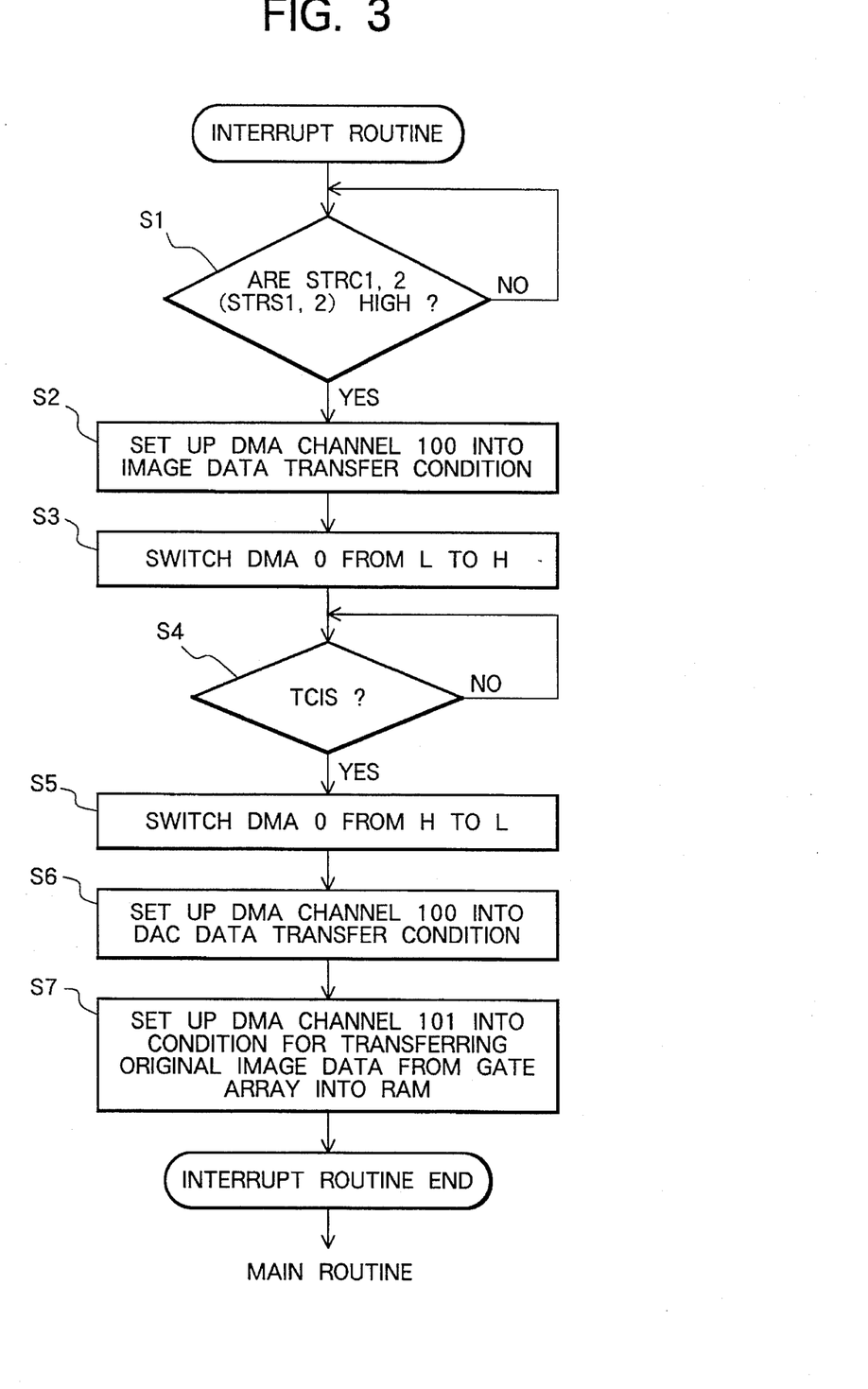
FIG. 3 is a flow chart of an interruption operation conducted in the facsimile machine of FIG. 1.

As shown in FIG. 2, the CCD image sensor array 7, the gate array 9 and the DMA channels 100 and 101 are so designed that the period of time $T_{read}$ required for completely reading out all the original image data of each line and for transferring them to the RAM 2 may have an almost fixed value lower than 5 ms. In other words, the CCD image sensor array 7, the gate array 9 and the DMA channels 100 and 101 are so designed that the pulse widths $W_{dma0}$ and $W_{dma1}$ of the DMA transfer control signals DMA0 and DMA1 of the high level may have an almost fixed value lower than 5 ms.

Since the DMA channel 100 is used for transferring the original image data from the RAM 2 to the shift register 81, the period of time $T_{transfer}$ required for completely transferring all the original image data of each line from the RAM 2 to the shift register 81 is very short and has an almost fixed value. In other words, the pulse width $W_{dma0}'$ of the DMA transfer control signal DMA0 of the high level has an almost fixed short value. As described already, the pulse widths $W_{str1}$ and $W_{str2}$ of the write strobe commands STRC1 and STRC2 (i.e., of the write strobe signals STRS1 and STRS2) of low levels are determined dependently on the temperature of the thermal head. However, the maximum values for the pulse widths $W_{str1}$ and $W_{str2}$ are determined to have fixed values. Accordingly, the time period $T_{record}$ required to record each line is determined equal to or lower than a fixed maximum value. Therefore, the total time period $T_{transfer-record}$, i.e., the sum of the period $T_{transfer}$ and the period $T_{record}$ is limited equal to or lower than a certain fixed value. In this example, the value of the pulse width $w_{dma0}'$ and the maximum value of the pulse widths $W_{str1}$ and $W_{str2}$ are selected so that the total time period $T_{transfer-record}$ is limited equal to or lower than 5 ms.

Since the values of the time periods $T_{transfer-record}$ and $T_{read}$ are thus selected, while the recording operation of one line (which will be referred to as a "noted line," hereinafter) is achieved, the reading operation of the next line can be conducted. When the reading operation of the next line is completed, after confirming that the recording operation of the noted line is completed, the transfer operation of the original image data for the next line to the shift register 81 is started. Accordingly, the recording operation and the reading operation can be performed synchronously with each other.

The mechanism how the reading operation and the recording operation are thus synchronized will be described in more detail hereinafter.

The start timing of the period $T_{read}$ is fixedly determined by the start pulse SP. As described above, the period $T_{read}$ has an almost fixed value lower than 5 ms and the period $T_{transfer-record}$ is limited equal to or lower than 5 ms. Accordingly, though the start timing $t_{transfer-record}$ of the period $T_{transfer-record}$ is determined dependently on whether or not recording operation for the preceding line has been finished, the start timing $t_{transfer-record}$ is almost fixed with respect to the start pulse timing. Since the period $T_{transfer}$ has an almost fixed value, the start timing $t_{record}$ of the period $T_{record}$ is also almost fixed to the start pulse timing. Since the start pulse SP is repeatedly generated by the time cycle of 5 ms, the start timing $t_{record}$ is also repeated by the time cycle of 5 ms. Thus, the recording operation repeatedly started at the timing $t_{record}$ is synchronized with the reading operation repeatedly started with the start pulse SP.

In order to read out each line of the original image, the reading operation for each line should be achieved during the original is fed by a line distance. Accordingly, the period $T_{read}$ should be located between two successive timings $t_{dp}$ and $t_{dp}$ at which the CPU switches the drive pulses PA, PB, PC and PD. Similarly, in order to record each line on the recording paper, the recording operation for each line should also be achieved during the recording paper is fed by a line distance. Accordingly, the period $T_{record}$ should also be located between two successive timings $t_{dp}$ and $t_{dp}$ at which the CPU switches the drive pulses PA, PB, PC and PD. In order to thus position the periods $T_{read}$ and $T_{record}$ between the two successive timings $t_{dp}$ and $t_{dp}$, in this example, the timing at which the start pulse SP is generated may be shifted from the timing $t_{dp}$ at which the drive pulses are switched. As apparent from FIG. 2, in this example, the start pulse timing is shifted from the timing $t_{dp}$ so that the start timing $t_{transfer}$ may substantially coincide with the timing $t_{dp}$.

It is further noted that the reading and recording operations for each line are consecutively conducted. Accordingly, operation efficiency rises and control becomes simple.

In the image transmission mode, the facsimile machine operates as will be described hereinafter.

When the image transmission mode is selected by an operator, the CPU 1 first sets up the DMA channel 100 into the condition for transferring the DAC data from the ROM 3 to the gate array 9. The CPU also sets up the DMA channel 101 into the condition for transferring the original image data from the gate array 9 to the RAM 2. Similarly as in the image copy mode, the CPU successively energizes the four pairs of coils of the stepper motor 12 at the time cycle of 5 ms. As a result, the original feeding mechanism 13 repeatedly feeds or increments the original by a line distance at the time cycle of 5 ms.

Also similarly as in the image copy mode, the gate array 9 outputs the start pulses SP at the time cycle of 5 ms. In response to a lowering edge of the start pulse SP, the CCD image sensor array 7 starts reading out the first line of an original image, and the CPU shifts the DMA transfer control signals DMA0 and DMA1 from LOW to HIGH. The CCD image sensor array 7 outputs to the gate array 9 the analog original image data representative of the first line. The gate array 9 compares the analog original image data for each picture element on the first line with the DAC data for the corresponding picture element position, and converts the analog original image data into digital form. Thus obtained digital original image data are transferred via the DMA channel 101 to the RAM 2 where they are temporarily stored. when all the original image data for the first line are completely transferred to the RAM 2 through the DMA channel 101, the DMA controller 10 outputs a transfer completion information signal TCIS to the CPU 1. Receiving the signal TCIS, the CPU shifts the DMA transfer control signals DMA0 and DMA1 from HIGH to LOW, to thereby stop the DMA transfer operation of the DMA channels 100 and 101. When the gate array 9 generates the start pulse SP again, the CCD image sensor array 7 starts reading the next (second) line of the original image, and the CPU switches the DMA transfer control signals DMA0 and DMA1 from LOW to HIGH. As a result, the digital original image data are produced for the next line and are transferred to the RAM 2. When all the original image data for the second line are completely transferred to the RAM 2, the DMA controller 10 again outputs the transfer completion information signal TCIS to the CPU. The CPU then shifts the DMA transfer control signals DMA0 and DMA1 from HIGH to LOW, to stop the DMA transfer operation. The above-described operation is repeatedly conducted, so that the digital original data for successive lines of the original image are produced and stored in the RAM 2.

While the successive lines of the original image are thus produced to be stored in the RAM 2, the information encoder 18 retrieves from the RAM 2 the digital original image data for the successive lines of the original image. The encoder 18 encodes them before transferring them to the communication controller 17. The communication controller further transfers the encoded data to the modem 16. The modem 16 modulates the encoded data and transmits them to a remote facsimile machine. The CPU controls timings of the above-described operations of the encoder 18, the communication controller 17 and the modem 16 so as to transmit the original image data representative of the successive lines at the transmission time cycle of 10 ms.

In the image reception mode, the facsimile machine operates as will be described hereinafter.

When the modem 16 receives incoming data from a remote facsimile machine, the facsimile machine is set into the image reception mode. In the image reception mode, the CPU first sets up the DMA channel 100 into the condition for transferring the incoming data from the RAM 2 to the gate array 9. The CPU sets up the DMA channel 101 into the condition for transferring no data. Similarly as in the image copy and the image transmission modes, the CPU successively energizes the four pairs of coils of the stepper motor 12 at the time cycle of 5 ms. As a result, the recording paper feeding mechanism 14 repeatedly feeds or increments the recording paper by a line distance at the time cycle of 5 ms.

In the image reception mode, the modem 16 receives the incoming data representative of successive lines of an image, at the predetermined transmission time cycle of 10 ms. When the modem 16 receives the incoming data representative of the successive lines, the modem 16 demodulates the incoming data and transfers them to the communication controller 17 from which the incoming data are further transferred to the information decoder 19. The decoder 19 decodes the incoming data and transfers the decoded data to the RAM 2 where the decoded incoming data are temporarily stored until the DMA channel 100 transfers them to the gate array 9.

When the CPU shifts the DMA transfer control signal DMA0 from LOW to HIGH, the DMA channel 100 starts transferring the incoming data for the first line to the gate array, from which the data are transferred to the shift register 81. When the DMA channel 100 completely transfers all the data for the first line to the shift register 81, the DMA controller 10 outputs a transfer completion information signal TCIS to the CPU 1. Receiving the signal TCIS, the CPU switches the DMA transfer control signal DMA0 from HIGH to LOW. In addition, the CPU successively switches the write strobe commands STRC1 and STRC2 from HIGH to LOW, whereupon the gate array 9 successively switches the write strobe signals STRS1 and STRS2 from HIGH to LOW. As a result, the thermal element groups 83a and 83b are successively driven to be selectively heated according to the data stored in the shift register 81, so that the first line of image is recorded on the heat-sensitive recording paper. Similarly as in the step S1 of the interruption routine in the image copy mode, the CPU confirms that both the commands STRC1 and STRC2 (i.e., the signals STRS1 and STRS2) return to HIGH, before switching the DMA transfer control signal DMA0 from LOW to HIGH so as to transfer the incoming data for the next (second) line to the shift register 81. The CPU repeatedly performs the above-described operation to thereby record the successive lines of image on the recording paper. In other words, a desired image represented by the successively received incoming data is completely recorded on the recording paper.

It is noted that the timing at which the CPU switches the DMA transfer control signal DMA0 from LOW to HIGH is so adjusted as to allow both the signals STRS1 and STRS2 to become LOW while the recording paper feeding mechanism 14 feeds the recording paper by one line distance.

It is further noted that in order to record a transaction report, data for the transaction report are sent from the ROM 3 to the shift register 81 also via the DMA channel 100.

As described above, according to the present invention, in the image copying operation, since the original image data for each line are transferred from the RAM 2 to the thermal head 8 in a direct access memory transfer manner, the time required for the transmission is short enough to allow transmitting and recording to be completed within a time period of 5 ms. Accordingly, while the recording operation of each line is conducted, the read out operation of the next line can be performed. This allows deleting the latch circuit from the thermal head and decreases the production cost of the facsimile machine.

While the invention has been described in detail with reference to specific embodiments thereof, it would be apparent to those skilled in the art that various changes and modifications may be made therein without departing from the spirit of the invention.

For example, although the preferred embodiment is directed to a facsimile machine to which applied is the present invention, the invention can be applied to an image copying apparatus.

I claim:

1. An image recording apparatus for reading out an original image on an original and reproducing the original image on image receiving medium, said image recording apparatus comprising:

means for synchronously feeding an original bearing an original image and image receiving medium for receiving an image, the original image having successive original image sections;

means for reading out each of the successive original image sections and for producing a set of original image data representative of the each original image section, said reading means cooperating with said feeding means so as to read out the successive original image sections one by one, to thereby produce successive sets of original image data representative of the successive original image sections one by one;

means for transferring one by one the successive sets of original image data from said reading means;

a shift register for receiving one by one the successive sets of original image data transferred by said transferring means;

means for recording an image section on the image receiving medium in accordance with each of the successive sets of original image data received by said shift register, said recording means cooperating with said feeding means so as to record successive image sections on the image receiving medium in accordance with the successive sets of original image data successively received by said shift register;

means for controlling said transferring means so that said recording means may complete recording an image section in accordance with a set of original image data which is received by said shift register and which represents each of the successive original image sections before said transferring means transfers to said shift register a next set of original image data representative of a next original image section which is positioned next to the each original image section and which is read out by said reading means subsequent to the each original image section; and means for temporarily storing each of the successive sets of original image data produced for each of the successive original image sections, wherein said transfer controlling means includes:

means for judging whether said recording means completes recording the image section in accordance with the set of original image data representative of the each original image section;

means for controlling said transferring means to start transferring the next set of original image data representative of the next original image section after when said judging means determines that said recording means completes recording the image section in accordance with the set of original image data representative of the each original image section, said reading means outputs each of the successive sets of original image data to said image data storing means and said transferring means transfers each of the successive sets of original image data from said temporary image data storing means to said shift register, and said transferring means includes first means for transferring each of the successive sets of original image data from said image data storing means to said shift register with a direct memory access transfer manner.

2. An image recording apparatus as claimed in claim 1, wherein said reading means produces each of the successive sets of original image data in analog form, and further comprising means for receiving each of the successive sets of analog original image data from said reading means and for converting it into digital form, said analog-digital conversion means outputting each of the successive sets of digital original image data to said image data storing means and said first direct memory access transfer means transfers each of the successive sets of digital original image data from said image data storing means to said shift register.

3. An image recording apparatus as claimed in claim 2, wherein the image receiving medium includes a heat-sensitive paper, and wherein said recording means includes:

a thermal element array adapted for recording an image section on the heat-sensitive paper; and a drive circuit for driving the thermal element array in accordance with a set of original image data received by said shift register to thereby control the thermal element array to record, on the heat-sensitive paper, an image section corresponding to the original image section represented by the set of original image data.

4. An image recording apparatus as claimed in claim 3, further comprising means for storing DAC data representative of a threshold value adapted for converting the analog original image data into digital form, wherein said first direct memory access transfer means also transfers the DAC data from said DAC data storing means to said analog-digital conversion means, said transfer controlling means controlling said first direct memory access transfer means to transfer the DAC data from said DAC data storing means to said analog-digital conversion means during said analog-digital conversion means receives a set of analog original image data representative of each of the successive original image sections so that said analog-digital conversion means may compare the set of analog original image data with the DAC data to thereby produce a set of digital original image data, the set of digital original image data being inputted to said image data storing means so as to be temporarily stored therein, said transfer controlling means further controlling said first direct memory access transfer means to transfer the set of digital original image data representative of the each original image section temporarily stored in said image data storing means to said shift register after when said judging means judges that said recording means completes recording an image section in accordance with a preceding set of original image data representative of a preceding original image section which is positioned precedingly to the each original image section and which is read out by said reading means precedingly to the each original image section.

5. An image recording apparatus as claimed in claim 4, further comprising second means for transferring each of the successive sets of digital original image data outputted from said analog-digital conversion means to said image data storing means.

6. An image recording apparatus as claimed in claim 1, wherein said feeding means includes a stepper motor for stepwisely rotating to transmit the original, and further comprising means for controlling said stepper motor to repeatedly advance in the stepwise rotation with a predetermined time cycle and for controlling said reading means to repeatedly start reading out the original image with the predetermined time cycle, to thereby allow said reading means to cooperate with said feeding means to read out one by one the successive original image sections defined on the original image.

7. An image recording apparatus as claimed in claim 6, wherein said feeding means includes a single stepper motor for stepwisely rotating to transmit both the original and the image receiving medium.

8. An image recording apparatus as claimed in claim 1, wherein said reading means includes photoelectric conversion means for receiving light from each of the successive original image sections and for producing electric analog original image data representative of the each original image section.

9. An image recording apparatus for reading out an original image on an original and reproducing the original image on image receiving medium, said image recording apparatus comprising:

a feeding mechanism synchronously feeding an original bearing an original image and image receiving medium for receiving an image, the original image having successive original image sections;

a reading device reading out each of the successive original image sections and for producing a set of original image data representative of the each original image section, said reading device cooperating with said feeding mechanism so as to read out the successive original image sections one by one, to thereby produce successive sets of original image data representative of the successive original image sections one by one;

a transfer unit transferring one by one the successive sets of original image data from said reading device;

a shift register for receiving one by one the successive sets of original image data transferred by said transfer unit;

a recording device recording an image section on the image receiving medium in accordance with each of the successive sets of original image data received by said shift register, said recording device cooperating with said feeding mechanism so as to record successive image sections on the image receiving medium in accordance with the successive sets of original image data successively received by said shift register;

a transfer controller controlling said transfer unit so that said recording device may complete recording an image section in accordance with a set of original image data which is received by said shift register and which represents each of the successive original image sections before said transfer unit transfers to said shift register a next set of original image data representative of a next original image section which is positioned next to the each original image section and which is read out by said reading device subsequent to the each original image section; and a random access memory for temporarily storing each of the successive sets of original image data produced for each of the successive original image sections, wherein said transfer controller includes:

a judging unit judging whether said recording device completes recording the image section in accordance with the set of original image data representative of the each original image section;

a transfer start controller controlling said transfer unit to start transferring the next set of original image data representative of the next original image section when said judging unit determines that said recording device completes recording the image section in accordance with the set of original image data representative of the each original image section, said reading device outputs each of the successive sets of original image data to said random access memory and said transfer unit transfers each of the successive sets of original image data from said random access memory to said shift register, and said transfer unit includes a first direct memory access transfer channel transferring each of the successive sets of original image data from said random access memory to said shift register with a direct memory access transfer manner.

10. An image recording apparatus as claimed in claim 9, wherein said reading device produces each of the successive sets of original image data in analog form, and further comprising an analog-digital converter receiving each of the successive sets of analog original image data from said reading device and converting it into digital form., said analog-digital converter outputting each of the successive sets of digital original image data to said random access memory and said first direct memory access transfer channel transfers each of the successive sets of digital original image data from said random access memory to said shift register.

11. An image recording apparatus as claimed in claim 10, wherein the image receiving medium includes a heat-sensitive paper, and wherein said recording device includes:

a thermal element array adapted for recording an image section on the heat-sensitive paper; and a drive circuit for driving the thermal element array in accordance with a set of original image data received by said shift register to thereby control the thermal element array to record, on the heat-sensitive paper, an image section corresponding to the original image section represented by the set of original image data.

12. An image recording apparatus as claimed in claim 11, further comprising a read only memory storing DAC data representative of a threshold value adapted for converting the analog original image data into digital form, wherein said first direct memory access transfer channel also transfers the DAC data from said read only memory to said analog-digital converter, said transfer controller controlling said first direct memory transfer channel to transfer the DAC data from said read only memory to said analog-digital converter during said analog-digital converter receives a set of analog original image data representative of each of the successive original image sections so that said analog-digital converter may compare the set of analog original image data with the DAC data to thereby produce a set of digital original image data, the set of digital original image data being inputted to said random access memory so as to be temporarily stored therein, said transfer controller further controlling said first direct memory access transfer channel to transfer the set of digital original image data representative of the each original image section temporarily stored in said random access memory to said shift register after when said judging unit judges that said recording device completes recording an image section in accordance with a preceding set of original image data representative of a preceding original image section which is positioned precedingly to the each original image section and which is read out by said reading device precedingly to the each original image section.

13. An image recording apparatus as claimed in claim 12, further comprising a second direct memory access transfer channel transferring each of the successive sets of digital original image data outputted from said analog-digital converter to said random access memory.

14. A facsimile machine providing an image transmission mode, an image reception mode and an image copy mode, said facsimile machine comprising:

feeding means for synchronously feeding an original bearing an original image and image receiving medium for receiving an image;

reading means, in cooperation with said feeding means, for reading out the original image and producing image data representative thereof in analog form;

DAC data storing means for storing DAC data representative of a threshold value;

analog-digital conversion means for receiving the DAC data from said DAC data storing means and the analog image data from said reading means to compare the analog image data with the DAC data to thereby convert the analog image data into digital form;

image data storing means for temporarily storing digital image data;

a shift register for receiving digital image data from said image data storing means;

recording means, in cooperation with said feeding means, for recording an image on the image receiving medium in accordance with the digital image data received by said shift register;

modem means for receiving digital image data from a remote facsimile machine and outputting the digital image data to said image data storing means in an image reception mode and for receiving the digital image data from said image data storing means and transmitting the digital image data toward a remote facsimile machine in an image transmission mode;

first transfer means connectable between said analog-digital conversion means and said DAC data storing means and between said shift register and said image data storing means;

second transfer means connected between said analog-digital conversion means and said image data storing means;

transfer control means for controlling said first transfer means to be connected between said analog-digital conversion means and said DAC data storing means in the image transmission mode, for controlling said first transfer means to be connected between said shift register and said image data storing means in the image reception mode, and for controlling said first transfer means to be connected alternately between said analog-digital conversion means and said DAC data storing means and between said shift register and said image data storing means in an image copy mode; and operation control means for performing:

the image transmission mode in which the analog image data is produced by said reading means and compared with the DAC data to be converted into the digital image data which is then transferred through said second transferring means to said image data storing means, from which the digital image data is outputted to said modem means;

the image reception mode in which the digital image data received by said modem means is outputted to said image data storing means from which the image data is transferred through said first transferring means to said shift register; and the image copy mode in which the analog image data is produced by said reading means and is compared with the DAC data to be converted into the digital image data which is then transferred through said second transferring means to said image data storing means, from which the digital image data is further transferred through said first transferring means to said shift register.

15. A facsimile machine as claimed in claim 14, wherein the original image has successive image sections, said reading means reading out the successive image sections one by one to thereby produce a successive sets of analog image data representative of the successive image sections one by one, and wherein in the image copy mode, said transfer control means controls said first transferring means to be connected between said DAC data storing means and said analog-digital conversion means at least during said analog-digital conversion means receives a set of analog image data representative of each of the successive image sections so that said analog-digital conversion means may compare the set of analog image data with the DAC data to thereby produce a set of digital image data representative of the each image section and to be connected between said image data storing means and said shift register at least after said recording means completes recording an image section in accordance with a preceding set of digital image data representative of a preceding image section which is positioned precedingly to the each image section and which is read out by said reading means precedingly to the each image section.

16. A facsimile machine as claimed in claim 15, wherein said transfer control means includes switching means for switching said first transferring means from a first condition connected between said DAC data storing means and said analog-digital conversion means to a second condition connected between said image data storing means and said shift register, said switching means including:

judging means for judging whether or not said recording means completes recording the image section in accordance with the preceding set of digital image data representative of the preceding image section; and switching means for switching said first transferring means from the first condition to the second condition after when said judging means determines that said recording means completes recording the image section in accordance with the preceding set of digital image data.

* * * * *